3,022,138
PREPARATION OF DIBORANE
Charles C. Clark, Kenmore, and Frank A. Kanda and Aden J. King, Syracuse, N.Y., assignors, by mesne assignments, to Olin Mathieson Chemical Corporation, a corporation of Virginia
No Drawing. Filed Mar. 16, 1956, Ser. No. 571,878
10 Claims. (Cl. 23—204)

This invention relates to the preparation of boron hydrides and, more particularly, provides a method for the production of diborane and related volatile and non-volatile boron hydrides.

The boron hydrides do not occur in nature but many of them have successfully been prepared. Diborane, tetraborane, two pentaboranes and decaborane are among the better known boron hydrides. Some of these materials and their organic derivatives are useful as fuels due to their high heats of oxidation. Diborane is useful for conversion to the higher boron hydrides and has been used to produce thin films of pure elementary boron by thermal decomposition of the hydride on a hot surface. Diborane and other hydrides are also useful for the synthesis of metal borohydrides and metal borides. The boron hydrides are extremely powerful reducing agents. They react with Lewis bases such as amonia, amines and pyridine and are thus useful starting materials for the preparation of boron-nitrogen compounds, for example, borazin, $B_3N_3H_6$ and many other compounds.

The process of the present invention comprises the process of reducing boron trioxide ($B_2O_3$) with a nonmetallic reducing agent in an atmosphere of hydrogen suitably at atmospheric pressure. In lieu of boron trioxide, borates in which boron is trivalent, for example, metaborates or tetraborates, especially ordinary borax, sodium metaborate, and calcium borates, can be used. Borax, when used, is preferably dehydrated suitably by heating to convert it to anhydrous borax. Boron trioxide ($B_2O_3$) is, however, preferred.

Elementary boron is the preferred non-metallic reducing agent used in the present process but carbon is eminently suitable and the boron carbides can also be used. Borides and carbides of metallic elements are suitable non-metallic reducing agents, for example, magnesium boride, calcium carbide, tungsten carbide and the like.

An intimate mixture of the solid reactants is prepared by mixing the finely powdered components. Preferably the mixture is compressed into homogeneous pellets or slugs. In these mixtures, sufficient reducing agent is used to reduce the boron present in the boron trioxide or borate to boron suboxide (BO), carbon and boron present in the reducing agent being oxidized to carbon monoxide and boron suboxide, respectively, and the metal present in the reducing agent being oxidized to its normal oxide form according to the periodic table (MgO in the case of magnesium boride, CaO in the case of calcium carbide and $WO_3$ in the case of tungsten carbide). The following equations set forth proportions of reactants which can be used:

$B_2O_3 + B \rightarrow 3BO$
$B_2O_3 + C \rightarrow 2BO + CO$
$5B_2O_3 + B_4C \rightarrow 14BO + CO$
$5B_2O_3 + Mg_3B_2 \rightarrow 12BO + 3MgO$
$7B_2O_3 + CaB_6 \rightarrow 20BO + CaO$
$3B_2O_3 + CaC_2 \rightarrow 6BO + 2CO + CaO$
$4B_2O_3 + WC_2 \rightarrow 8BO + CO + WO_3$
$3B_2O_3 + TiC \rightarrow 6BO + CO + TiO_2$
$2NaBO_3 + B \rightarrow Na_2O + 3BO$ Preferably, the amount of reducing agent employed is from 3 to 10 times that just stated and amounts up to 1,000 times that just stated can be used. Ratios as high as 1000:1 appear to offer little economic advantage. The foregoing equations are not necessarily intended to suggest intermediates or reaction mechanisms but are used for calculation only. The actual reactions require hydrogen as a reactant and produce boron hydrides as products.

In addition to the solid reactants, hydrogen gas is supplied to the reaction and it requires no special purification. Commercial hydrogen as supplied in cylinders under pressure is satisfactory. Hydrogen may be supplied to the reaction in the form of a hydrocarbon, for example, methane, ethane, ethylene, propylene, acetylene or mixtures thereof. Under the reaction conditions, such hydrocarbon gases crack to form carbonaceous products and hydrogen gas.

The reaction is carried out by heating a suitable mixture of boric anhydride or borate with the non-metallic reducing agent to a temperature of 850–1500° C. while contacting the mixture with hydrogen. The necessary heat is supplied in any suitable manner. A particularly advantageous method is by electrical induction. For this purpose an electrically conductive material is provided to support or surround the reaction mixture and is arranged for the introduction of hydrogen gas and removal of the gaseous products. A vertical graphite tube of suitable diameter, water-jacketed at one end and arranged to support the reaction mixture at the other, has been utilized satisfactorily. The graphite tube is surrounded by a fused silica jacket which, in turn, is jacketed and water-cooled. Hydrogen gas introduced into the water cooled end of the graphite tube, contacting the reaction mixture and then passing into an ordinary glass system for collection of the products. The outer jacket is surrounded by the turns of an induction coil suitably supplied with high-frequency current.

The diborane product is separated from unreacted hydrogen and other products of the reaction suitably by condensation at low temperatures. The residual hydrogen is suitable for recycle to the reaction zone.

The principal gaseous product of the reaction is diborane but small proportions of other boron hydrides may be obtained under some conditions as liquids or solids. These are readily removed in a cool zone before condensing the diborane product from the gas. When carbon is introduced as carbon, a carbide or as a hydrocarbon gas, by-product carbon monoxide may combine with the diborane at low temperatures to form borane carbonyl ($BH_3CO$). This compound is largely dissociated at room temperatures according to the equation:

$$2BH_3CO \rightleftharpoons B_2H_6 + 2CO$$

The diborane can be readily separated from the mixture by any suitable means, for example, scrubbing with a solvent for diborane in which the carbon monoxide is substantially insoluble. Suitable solvents include diethyl ether and tetrahydrofuran. The diborane can be recovered from the solution by stripping at a temperature higher than the scrubbing temperature and collecting the diborane by low temperature condensation. Thus the gas mixture can be scrubbed at 25° C. and the solution stripped by vacuum treatment at 40° C. The residual lean solution is recycled to the scrubbing operation.

*Example 1*

A Vycor (fused silica) tube about 1¼ inches in diameter and 8 inches long was arranged vertically with an exit at the top for the gaseous products of the reaction. Inserted into the fused silica tube from the bottom was a graphite cylinder ending about 2 inches below the top of the fused silica tube and extending below it. The graphite cylinder had an external diameter of about ¾ inch and an internal diameter of about ½ inch and a wall thickness of ⅛ inch. It was retained in place by a stopper at the bottom and the extended part of the graphite carried a water cooling jacket. A tantalum plate about 2 inches below the top of the graphite cylinder and arranged inside the graphite cylinder supported the solid mixture charged to the reaction. The silica tube was surrounded by a water jacket. At the level of the tantalum liner the water jacket was surrounded by an induction heater comprising several turns of heavy copper tubing about ¼ inch in external diameter and cooled internally by a stream of water. The induction heater was supplied by a high frequency current. The tantalum support was charged with 10 g. of a pelletized mixture of boric anhydride ($B_2O_3$) and carbon containing 58 weight percent of carbon and 42 weight percent of boric anhydride. The mole ratio of carbon to $B_2O_3$ was about 8:1. The mixture was heated at a temperature of 1200° C. for a total of 3 hours while a stream of hydrogen amounting to about 1.5 to 2 liters per minute was passed through the apparatus. The exit gases were cooled in a trap at −196° C. and the uncondensed hydrogen was burned in air. (In operating the process cyclically, the hydrogen is recycled through the reaction chamber by means of a pump.) At the end of 2 hours of heating, 156 milligrams of product had been collected. It was analyzed by means of an infrared spectrum and by measuring the vapor pressure of the mixture and found to comprise 16 milligrams of diborane and 140 milligrams of borane carbonyl ($BH_3CO$). The latter compound is dissociated at room temperature and the mixture at that temperature comprised 62 milligrams of diborane and 94 milligrams of carbon monoxide. An additional 2 hours of heating at the same temperature yielded an additional 10 milligrams of diborane and 11 milligrams of borane carbonyl. The total diborane formed in the three hours of heating amounted to 75 milligrams.

*Example II*

The procedure of Example I was repeated using 8 grams of a pelletized mixture of carbon and boric oxide of 100:1 by weight. Diborane was similarly formed.

*Example III*

The apparatus of Example I was charged with 4 g. of a mixture comprising 1 g. of boric anhydride ($B_2O_3$) and 3 grams of boron carbide ($B_4C$). The finely powdered mixture was dehydrated by heating for about ½ hour at 500° C. at atmospheric pressure until the exit hydrogen burned without the formation of a green flame. The mixture was then heated for about 1 hour at 1000° C. in a stream of hydrogen and the gaseous product was condensed at −196° C. A yield of 17 milligrams of diborane was formed in the first hour of heating. It was identified by its infrared spectrum and measurement of vapor pressure.

*Example IV*

A Vycor (fused silica) tube about 1 inch in diameter was arranged horizontally and surrounded by a resistance heater. A powdered mixture of 2.58 g. of boric anhydride ($B_2O_3$) with 2.59 g. of boron was placed in a silica boat and placed in the tube. It was heated for 13 hours at a temperature of 1000° C. while passing hydrogen through the tube at the rate of 1.5 to 2 liters per minute. The exit gases passed through a trap cooled with liquid nitrogen and 0.156 g. of diborane was condensed therein. An analysis of the residue in the boat after the run showed that it still contained 50 percent $B_2O_3$. The calculated yield of diborane from the consumed boric anhydride was about 20 percent.

*Example V*

3 g. of a mixture of tungsten carbide and boric anhydride ($B_2O_3$) in a molar proportion of 3:1 was introduced into the apparatus described in Example I and heated at a temperature of about 1200° C. while hydrogen at the rate of 2 liters per minute was passed through the reaction chamber. The exit gases passed through two traps and then to a nozzle where the exit gas was burned in air. While the traps were at room temperature, the temperature of the reaction mixture was gradually raised. At about 850° C. the burning hydrogen began to acquire a green color due to the presence in the gas of diborane. When the temperature of the sample reached about 1000° C. the green flame was very intense. When one of the traps was cooled to −196° C. the green color disappeared and diborane began to condense in the trap. After a sensible amount of diborane had condensed in the trap it was cut off from the line from the reaction tube. By warming the first trap and cooling a second trap connected thereto to −196° C., the solid product was distilled to the second trap. When the first trap was disconnected and the second trap allowed to warm to room temperature with a stream of hydrogen flowing therethrough, the exit gas burned with a strong green flame.

*Example VI*

About 2 g. of a pelletized mixture of boron and boric anhydride ($B_2O_3$) in a molar ratio of 4:1 was heated at a temperature of 1000° C. in the apparatus of Example I substituting methane flowing at the rate of 2 liters per minute for hydrogen as the hydrogenating agent. Diborane was formed.

*Example VII*

5.167 g. of a pelletized mixture of boron and $B_2O_3$ in a molar ratio of 3:1 was heated in an atmosphere of hydrogen flowing at the rate of 2 liters per minute at a temperature of 950° C. in the apparatus of Example I. Diborane was formed.

*Example VIII*

About 2 g. of a pelletized mixture of boron and sodium metaborate ($NaBO_2$) in a molar ratio of 3:1 was heated in an atmosphere of hydrogen flowing at the rate of 2 liters per minute at atmospheric pressure at 1000° C. in the apparatus of Example I. Diborane was formed.

We claim:

1. A method for the production of diborane which comprises heating a mixture of a reducing agent selected from the group consisting of elemental boron, carbon, boron carbides, alkaline earth metal borides, tungsten carbide and titanium carbide and a material selected from the group consisting of boron trioxide and alkali and alkaline earth metal oxygen-containing borates in which boron is trivalent in a hydrogen atmosphere at a temperature of from 850° C. to 1500° C., and recovering diborane from the resulting gaseous effluent the amount of said reducing agent employed being from 1 to 1000 times that calculated to convert the boron in said mixture to boron suboxide, any carbon present in said reducing agent to carbon monoxide, any alkali metal present in said mixture to its normal oxide form according to the periodic table, any alkaline earth metal present in said mixture to its normal oxide form according to the periodic table, any tungsten present to $WO_3$, and any titanium present to $TiO_2$.

2. The method of claim 1 wherein the amount of said reducing agent is 3 to 10 times that calculated to convert the boron in said mixture to boron suboxide, any carbon present in said reducing agent to carbon monoxide, any alkali metal present in said mixture to its normal oxide form according to the periodic table, any alkaline earth metal present in said mixture to its normal oxide form according to the periodic table, any tungsten present to $WO_3$, and any titanium present to $TiO_2$.

3. The method of claim 1 wherein said material is boron trioxide.

4. The method of claim 1 wherein said reducing agent is carbon.

5. The method of claim 1 wherein said reducing agent is boron carbide.

6. A method for the preparation of gaseous mixture containing diborane which comprises heating from 3 to 10 moles of carbon and one mole of boron trioxide in a hydrogen atmosphere at a temperature of from 850° C. to 1500° C.

7. A method for the preparation of gaseous mixture containing diborane which comprises heating from 3 to 10 moles of boron carbide and 5 moles of boron trioxide in a hydrogen atmosphere at a temperature of from 850° C. to 1500° C.

8. A method for the preparation of gaseous mixture containing diborane which comprises heating from 3 to 10 moles of boron and one mole of boron trioxide in a hydrogen atmosphere at a temperature of from 850° C. to 1500° C.

9. A method for the preparation of gaseous mixture containing diborane which comprises heating from 1 to 3 moles of tungsten carbide and 4 moles of boron trioxide in a hydrogen atmosphere at a temperature of from 850° C. to 1500° C.

10. A method for the preparation of gaseous mixture containing diborane which comprises heating from 3 to 10 moles of boron and 2 moles of sodium metaborate in a hydrogen atmosphere at a temperature of from 850° C. to 1500° C.

References Cited in the file of this patent

UNITED STATES PATENTS

| | | |
|---|---|---|
| 1,897,214 | Ridgway | Feb. 14, 1933 |
| 2,678,870 | Cooper | May 18, 1954 |

OTHER REFERENCES

Deming's Periodic Chart of the Elements from "General Chemistry," 5th Ed., by H. G. Deming. John Wiley and Sons, Inc.

Moeller: "Inorganic Chemistry," pages 409–10, 1952, John Wiley and Sons, N.Y.C.

Kanda et al.: "J.A.C.S.," vol. 78, pp. 1509, 1510, April 5, 1956.

Zintl et al.: "Zeitschrift für Anorganische und Allgemeine Chemie," vol. 245, pages 8–11 (1940).

Schafer: "Chemiker Zeitung," vol. 75, No. 3, pp. 48–51 (1951).

Moeller: "Inorganic Chemistry," page 770 (1952), John Wiley and Sons, Inc.

Hubbard's Periodic Chart of the Atoms, 1956 Edition. W. M. Welch Mfg. Co., Chicago, Ill.

UNITED STATES PATENT OFFICE
CERTIFICATE OF CORRECTION

Patent No. 3,022,138            February 20, 1962

Charles C. Clark et al.

It is hereby certified that error appears in the above numbered patent requiring correction and that the said Letters Patent should read as corrected below.

Column 1, line 68, for "$2NaBO_3$" read -- $2NaBO_2$ --; column 2, line 29, after "gas" insert -- is --; line 68, for "endng" read -- ending --.

Signed and sealed this 31st day of July 1962.

(SEAL)
Attest:

ERNEST W. SWIDER
Attesting Officer

DAVID L. LADD
Commissioner of Patents